E. BRADFIELD.
Smut Machine.
No. 1,794. Patented Sept. 19, 1840.
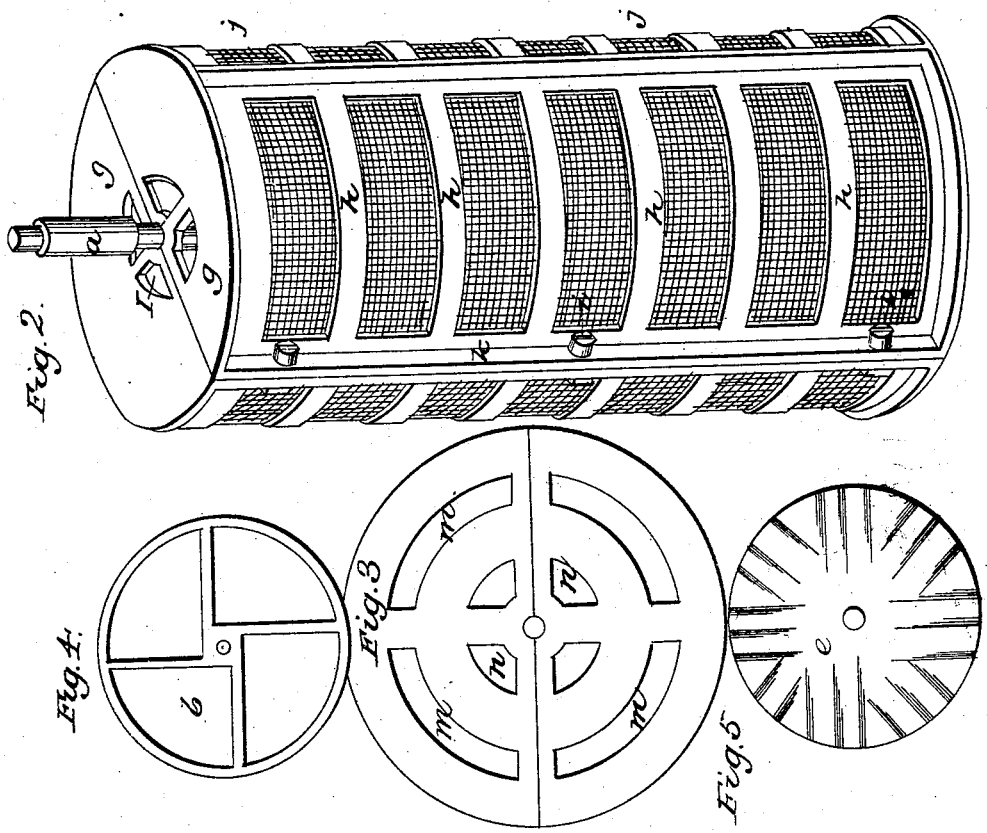
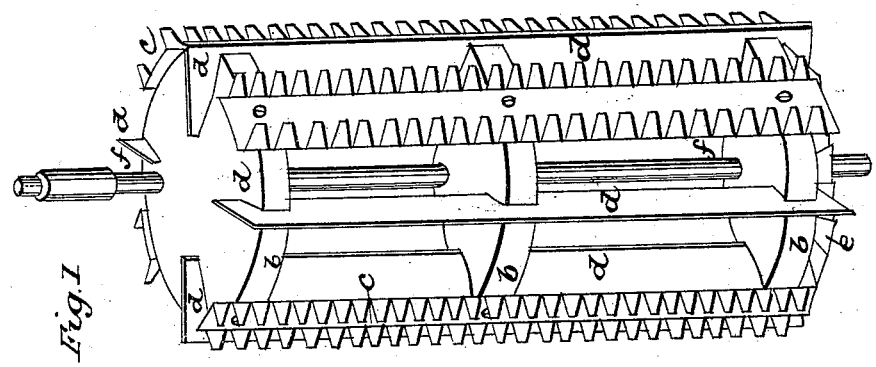
WITNESSES
J. P. Van Tyne
Hazard Knowles
INVENTOR
Edward Bradfield

UNITED STATES PATENT OFFICE.

EDWARD BRADFIELD, OF ROCHESTER, NEW YORK.

MACHINERY FOR CLEANING GRAIN, &c.

Specification of Letters Patent No. 1,794, dated September 19, 1840.

*To all whom it may concern:*

Be it known that I, EDWARD BRADFIELD, of Rochester, in the county of Monroe and State of New York, have invented a new and useful Machine for Cleaning Smutty Wheat; and I do hereby declare the following to be a full and exact description of the same.

Figure 1, is the inside or revolving part of the machine $a$, $a$, the spindle passing perpendicularly through the center. $b$, $b$, $b$, are bands of metal and part of the frame, as shown by Fig. 4, and covered by wire gauze for the purpose of throwing the grain from the center out toward the circumference. $c$, $c$, $c$, $c$, are plates of metal secured perpendicularly opposite each other on the bands $b$, $b$, $b$, by screws and nuts, the edges cut into teeth and so tempered as to be elastic, and turned up at right angles in such manner that one row covers the interstices formed by the other. $d$, $d$, $d$, $d$, $d$, $d$, $d$, are connecting plates passing perpendicularly through the machine opposite each other and equidistant between each of the teeth plates $c$, $c$, $c$, $c$, for the purpose of keeping the grain out toward the circumference. $e$, is a circular plate of metal cut in rays verging from the center, lapping one over the other in one direction around the center as shown in Fig. 5. $f, f, f,$ is a wire gauze covering the bands $b$, $b$, $b$, which constitute the top, bottom, and center of the machine.

Fig. 2, represents the machine entire, being a cylindrical frame formed of equal longitudinal halves, and secured by screws and nuts $i$, $i$, $i$, through the clamps K. $h$, $h$, $h$, $h$, $h$, $h$, are ribs of metal or wood being a portion of the frame work. $j$, $j$, $j$, $j$, $j$, $j$, $j$, is the wire gauze covering the frame on the inside and completing the cylinder. $l$, $l$, are holes or apertures in the top plate for the purpose of admitting the grain into the machine.

Fig. 3, shows the bottom plate of the cylinder, Fig. 2. $m$, $m$, $m$, $m$, are apertures in the bottom of the plate for the exit of the grain from the machine. $n$, $n$, $n$, $n$, are apertures in the bottom plate nearer the center for the purpose of admitting a current of air upward into the cylinder.

Fig. 4, is a plan of the bands supporting the inside frame as $b$, $b$, $b$, in Fig. 1.

Fig. 5, is a circular plate as described in Fig. 1, revolving on the spindle $a$, for the purpose of creating a current of air upward into the machine, and directing the grain out at the aperture $m$, $m$, $m$, $m$.

The advantages to be derived from the use of this machine are as follows: 1st. The cylinder being open, and the revolving portion of the machine causing a strong current of air outward, the smut dust is discharged as soon as separated from the wheat, thus the trouble and expense of screening and fanning afterward may be dispensed with. 2nd. The teeth being elastic, and their ends coming nearly in contact with the wire gauze $j$, $j$, $j$, $j$, Fig. 2, and so arranged that every row covers the interstices formed by the teeth in the opposite rows, it is impossible for the grain to pass from the top to the bottom of the cylinder while in motion, without coming in contact with them and being thoroughly scoured and scraped of any dust or filth that may adhere to the grain, and the elasticity of the teeth giving them a self regulating power, so as to accommodate themselves to any resisting force or motion by damp or dry grain, without breaking or defacing the kernel. 3d. Its economy and simplicity of construction and adaptation to effect the object intended, that even the most foul grain after being exposed to the action of these elastic teeth is discharged so pure and sound that good merchantable flour may be made therefrom.

What I claim as my invention and desire to secure by Letters Patent, is—

Constructing the revolving cylinder with elastic teeth as herein set forth, also, in combination with the above the revolving radial plate at the bottom of the machine, in which is combined their self regulating power, so as to effect the greatest possible good for the purpose intended as herein set forth.

EDWARD BRADFIELD.

Witnesses:
J. P. VAN TYNE,
JNO. W. HOLLIS.